United States Patent
Millner et al.

(10) Patent No.: US 8,287,620 B2
(45) Date of Patent: Oct. 16, 2012

(54) METHOD FOR THE MELTING OF PIG IRON WITH THE RECIRCULATION OF BLAST FURNACE GAS AND WITH THE ADDITION OF HYDROCARBONS

(75) Inventors: Robert Millner, Loosdorf (AT); Kurt Wieder, Schwertberg (AT); Johann Wurm, Bad Zell (AT)

(73) Assignee: Siemens Vai Metals Technologies GmbH (AT)

( * ) Notice: Subject to any disclaimer, the term of this patent is extended or adjusted under 35 U.S.C. 154(b) by 25 days.

(21) Appl. No.: 12/867,551

(22) PCT Filed: Jan. 29, 2009

(86) PCT No.: PCT/EP2009/000556
§ 371 (c)(1),
(2), (4) Date: Aug. 13, 2010

(87) PCT Pub. No.: WO2009/100819
PCT Pub. Date: Aug. 20, 2009

(65) Prior Publication Data
US 2010/0313711 A1    Dec. 16, 2010

(30) Foreign Application Priority Data

Feb. 15, 2008   (AT) .................................. A 248/2008

(51) Int. Cl.
*C21B 5/06* (2006.01)
(52) U.S. Cl. .......................................... 75/464; 75/468
(58) Field of Classification Search .................... 75/464, 75/468
See application file for complete search history.

(56) References Cited

U.S. PATENT DOCUMENTS

| | | | |
|---|---|---|---|
| 3,909,446 A | 9/1975 | Miyashita et al. | |
| 3,912,502 A | 10/1975 | Miyashita et al. | |
| 3,935,002 A * | 1/1976 | Miyashita et al. | 75/468 |
| 3,966,457 A * | 6/1976 | Limpach et al. | 75/460 |
| 2001/0003930 A1 | 6/2001 | Montague et al. | |

FOREIGN PATENT DOCUMENTS

| | | |
|---|---|---|
| DE | 1939354 A1 | 2/1971 |
| DE | 2401991 A1 | 7/1974 |

(Continued)

OTHER PUBLICATIONS

American Iron and Steel Institute. "The Making of Steel". New York, NY. 1954. pp. 25-27.*

(Continued)

*Primary Examiner* — George Wyszomierski
*Assistant Examiner* — Tima M McGuthry Banks
(74) *Attorney, Agent, or Firm* — Ostrolenk Faber LLP

(57) ABSTRACT

A method for the melting of pig iron in a blast furnace (1) operated with oxygen or in a melt-reduction plant, with a reduction region. Purified crude gas is discharged from the reduction region and is recirculated into the reduction region with the addition of hydrocarbons. The purified crude gas is mixed with hydrocarbons and is also blended with a reduction gas which has a temperature of above 1000° C. and which is generated by partial oxidation of hydrocarbons by means of oxygen gas having an oxygen content of above 90% by volume, in order to form a recirculation gas with a temperature of above 800° C. The recirculation gas is recirculated into the reduction region according to an auto-reforming process.

8 Claims, 2 Drawing Sheets

FOREIGN PATENT DOCUMENTS

| | | |
|---|---|---|
| DE | 2261766 | 9/1977 |
| DE | 3702875 | 4/1988 |
| DE | 4041689 A1 | 10/1991 |
| DE | 102004036767 A1 | 3/2005 |
| DE | 102005018712 A1 | 11/2006 |
| GB | 883998 A | 12/1961 |
| GB | 2243840 A | 11/1991 |
| WO | WO 2004/052510 A | 8/2004 |

OTHER PUBLICATIONS

International Search Report dated May 28, 2009, issued in corresponding international application No. PCT/EP2009/000556.

* cited by examiner

METHOD FOR THE MELTING OF PIG IRON WITH THE RECIRCULATION OF BLAST FURNACE GAS AND WITH THE ADDITION OF HYDROCARBONS

CROSS-REFERENCE TO RELATE APPLICATIONS

The present application is a 35U.S.C.§§371national phase conversion of PCT/EP2009/000556, filed Jan. 29, 2009, which claims priority of Austrian Application No. A248/2008, filed Feb.15, 2008, the contens of wich are incorporated by reference herein. The PCT International Application was published in the German language.

BACKGROUND OF THE INVENTION

The invention relates to a method for melting pig iron using recirculated gas from the reduction region.

According to the prior art, various methods for the melting of pig iron are known. For example, GB 883998 A describes, in blast furnaces, injecting various carbon-containing gases, such as natural gas or coke oven gas, via the tuyers or at the bosh level, in order thereby to save coke and increase the efficiency of the plant. An injection of blast furnace gas from a conventional blast furnace operated with hot blast air is not economical because of the high content of carbon dioxide and nitrogen and the low content of hydrogen.

DE 19 39 354 A describes the reforming of blast furnace gas from a blast furnace with hydrocarbon fuel in an underfired external reaction system and the recirculation of this blast furnace gas into the blast furnace. This has the disadvantage of the additional outlay required in terms of energy for the underfiring of the heater and also the very high outlay for the high-temperature heat exchanger. Furthermore, during heating, disadvantages arise because of what is known as "metal dusting corrosion" caused by carbon monoxide and hydrogen in the reduction gas.

DE 2 261 766 describes the recirculation of blast furnace gas from a blast furnace operated with oxygen instead of hot blast air. After the scrubbing of the blast furnace gas, the carbon dioxide is removed, and is introduced to the blast furnace via tuyers on the bosh or hearth. Furthermore, the operation of a blast furnace with oxygen and the recirculation of the blast furnace gas and also the use of a $CO_2$ removal plant are also described in DE 3702875 C1. WO 2004/052510 A3 describes the operation of a blast furnace with hot blast air and the recirculation of blast furnace gas and also the removal of carbon dioxide and nitrogen. In these embodiments, however, there are substantial disadvantages in the considerable outlays in terms of investment and operating costs for the removal of carbon dioxide and nitrogen from the blast furnace gas and also in the necessary heating of the reduction gas, this giving rise, again, to problems with metal dusting corrosion. Moreover, the residual gas from $CO_2$ removal has to be delivered for utilization or retreatment on account of the low calorific value. In this case, further, the carbon dioxide is locked out in the blast furnace gas, thus leading to adverse $CO_2$ emissions, because it is not reformed again into reduction gas. Additional losses of reductants therefore occur in the residual gas.

The same disadvantages arise also in a method according to DE 10 2004 036 767 A1 which is interpreted as the nearest prior art. This document describes a method for pig iron production in a blast furnace operated with oxygen and recirculated blast furnace gas, with the addition of hydrocarbons, although, once again, the previous removal of carbon dioxide is required.

SUMMARY OF THE INVENTION

The aim of the invention, therefore, is, with the aid of an improved method for the melting of pig iron, to avoid these disadvantages and, in particular, to provide a method in which no complicated removal of carbon dioxide and/or nitrogen is required. As a result, residual gas occurring due to the $CO_2$ removal is to be avoided, and the overall costs of the plant with regard to the outlay in investment and operational terms are reduced.

These aims are implemented by means of the invention which relates to a method for the melting of pig iron in a blast furnace operated with oxygen or in a melt-reduction plant, with a reduction region, the purified crude gas discharged from the reduction region being recirculated into the reduction region with the addition of hydrocarbons. According to the invention, there is provision for the purified crude gas discharged from the reduction region to be mixed with hydrocarbons. Subsequently, this gas mixture is blended with a reduction gas which has a temperature above 1000° C. and is generated by the partial oxidation of hydrocarbons by means of oxygen gas having an oxygen content above 90% by volume. In this step, the required temperature of the recirculation gas for the following auto-reforming process is reached. Subsequently, the hydrocarbons contained in the purified crude gas are reformed with the gas components likewise contained in it, carbon dioxide and water and are then recirculated into the reduction region. In this case, as a result of the reforming process, the recirculation gas is cooled further to temperatures of about 800° C.

In the case of a blast furnace, the reduction region lies inside the blast furnace and, in the case of a melt-reduction plant, it lies in the melt-down gasifier and also in the separate reduction shaft.

There are present advantageous embodiments of the invention. Thus, for example, the auto-reforming process may be accelerated with the aid of a reformer filled with a corresponding catalyst. A particularly beneficial recirculation of the recirculation gas into the reaction chamber of a blast furnace may take place, for example, via the tuyers, at the level above the tuyers or in the shaft of the blast furnace. In this case, if the recirculation gas is recirculated via the tuyers, an injection of small coal may also be provided. Furthermore, the hydrocarbons supplied to the purified crude gas may be hydrocarbons of the general formula $C_nH_m$ or a mixture of these hydrocarbons. With regard to the crude gas, heat recovery may be provided, or dry de-dusting for the purification of the crude gas.

BRIEF DESCRIPTION OF THE DRAWINGS

The invention is explained in more detail below with reference to various embodiments with the aid of the accompanying figures in which.

DESCRIPTION OF EMBODIMENTS

Figure 1:
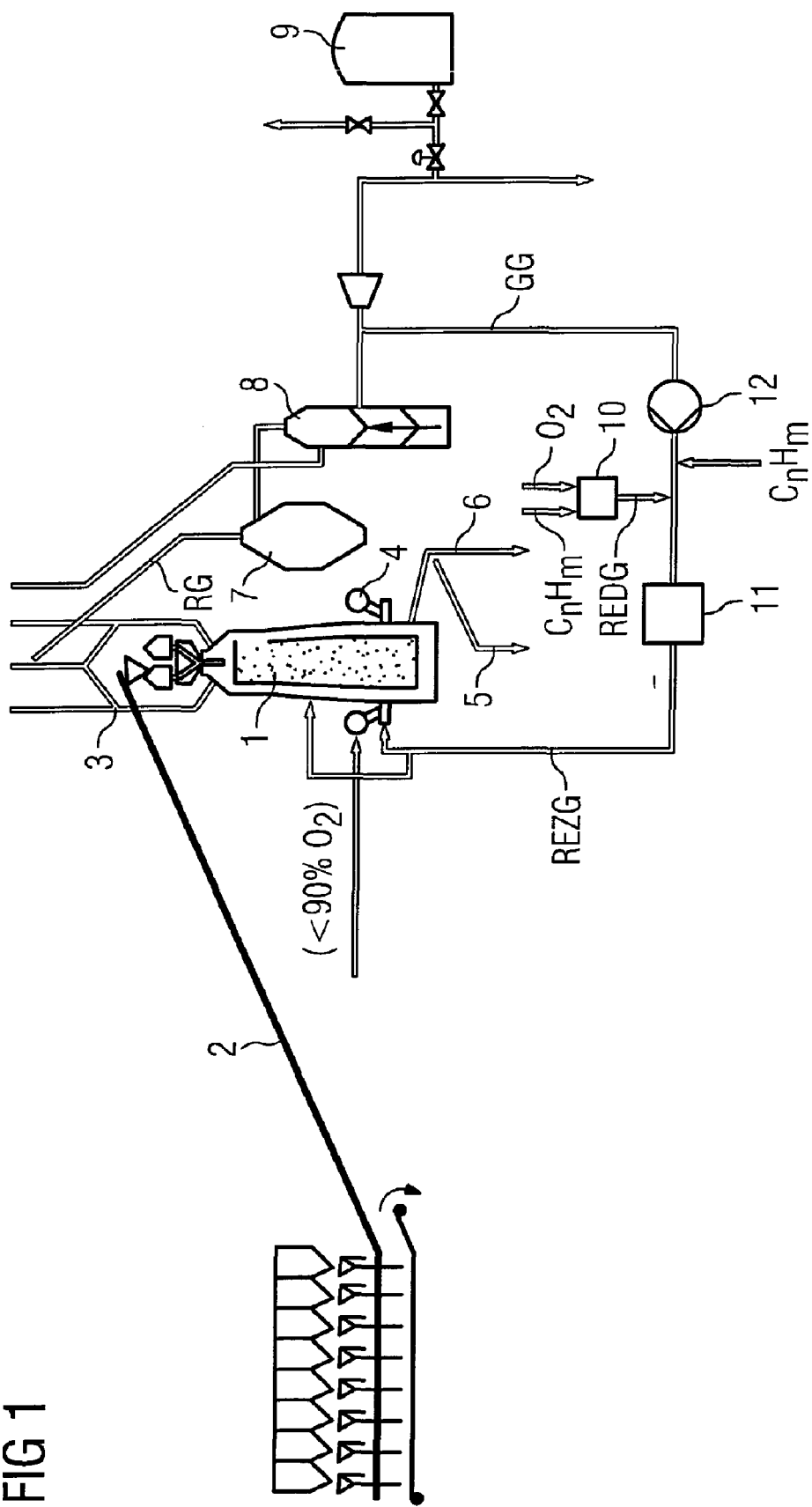
FIG. 1 shows a diagram of the application of the method according to the invention for the melting of pig iron in a blast furnace.

A first embodiment of the method according to the invention is described with reference to FIG. 1. FIG. 1 shows a blast furnace 1 in which iron is obtained by the reduction of iron oxide. For this purpose, the raw materials, in particular the burden containing the iron oxide, aggregates and coke, are conveyed to the top closing device 3 of the blast furnace 1 via an inclined hoist 2 or steep belt conveyor 2 and are introduced into the interior of the blast furnace 1. The blast furnace 1 may be seen as a metallurgical reactor in which the burden column reacts in countercurrent, for example, with injected oxygen which is introduced via the tuyers 4. The gasification of the carbon from the coke gives rise to the heat necessary for the reaction and to carbon monoxide which flows through the burden column and reduces the iron oxide. On the way from the top closing device 3 to the foot of the blast furnace 1, different physical-chemical processes occur in this case, so that, as a rule, different regions within the blast furnace 1 also differ from one another, for example a melting zone, carburizing zone, reduction zone, etc. These regions are summarized below and, for this exemplary embodiment, are designated in general as a reduction region. Subsequently, at the foot of the blast furnace 1, a pig iron fraction 5 and a slag fraction 6 can be obtained which are periodically tapped.

The crude gas RG which is formed in the reduction region and which is also designated here as blast furnace gas is drawn off at the upper shaft end of the blast furnace 1, de-dusted, dry, in a de-duster 7 and purified in a blast furnace gas scrubber 8. The purified crude gas is in this case therefore also designated as purified blast furnace gas GG. Blast furnace gas also contains, in addition to carbon monoxide, fractions of carbon dioxide and also hydrogen and water vapor and, if appropriate, small quantities of nitrogen. The purified blast furnace gas GG, as a rule, is partially recirculated into the blast furnace 1 and used as reducing agent. Further fractions of the purified blast furnace gas GG may be used in a power station for current generation 9, for the heating of annealing and reheating furnaces or as underfiring gas for the coke ovens.

Furthermore, the combustion chamber 10 and the reformer 11 necessary for carrying out the method according to the invention are evident in FIG. 1. In the combustion chamber 10, hydrocarbons, for example natural gas, are oxidized under-stoichiometrically with oxygen gas which contains an oxygen fraction of above 90% by volume. A large part of the $CH_4$ (and further higher hydrocarbons) is in this case partially oxidized, only a small part is burnt, and a very small fraction does not react at all. The chemical reactions may be summarized as follows:

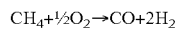

$CH_4 + \tfrac{1}{2}O_2 \rightarrow CO + 2H_2$

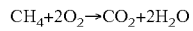

$CH_4 + 2O_2 \rightarrow CO_2 + 2H_2O$

$CH_4 \rightarrow CH_4$

Downstream of the combustion chamber 10, a reduction gas REDG is therefore obtained, which consists mainly of $H_2$ and CO with a temperature of approximately 1500° C.

The purified blast furnace gas GG is first compressed in a compressor 12, blended with hydrocarbons of the general formula $C_nH_m$ or a mixture thereof, for example natural gas, and subsequently mixed uniformly with the reduction gas REDG from the combustion chamber 10. The gas thus formed is designated below as recirculation gas REZG. For this purpose, a sufficient mixing zone or mixing chamber for setting a uniform temperature distribution is required. As a result of this mixing, the initial temperature of the reduction gas REDG is lowered, and temperatures of the recirculation gas REZG of about 1000° C. are achieved. The temperature of the recirculation gas REZG is in any event to amount to more than 800° C. in order to prevent carbon separation in the case of unfavorable Boudouard equilibria.

This recirculation gas REZG is subsequently routed through a reformer 11 which is a vessel or tubes filled with a catalyst, the reforming of the hydrocarbon-containing gases taking place, and the quality of the gas being appreciably improved due to the increase in the CO and $H_2$ content in relation to the $CO_2$ and $H_2O$ content. The reactions taking place in the reformer 11 may be summarized as follows:

$C_nH_m + nCO_2 \rightarrow 2nCO + m/2H_2$

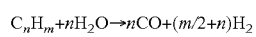

$C_nH_m + nH_2O \rightarrow nCO + (m/2+n)H_2$

As a result of the reforming process, the recirculation gas REZG is cooled further to temperatures of about 800° C. The recirculation gas REZG is subsequently introduced either via the tuyers 4, at the level above the tuyers 4 or into the shaft of the blast furnace 1.

Figure 2:
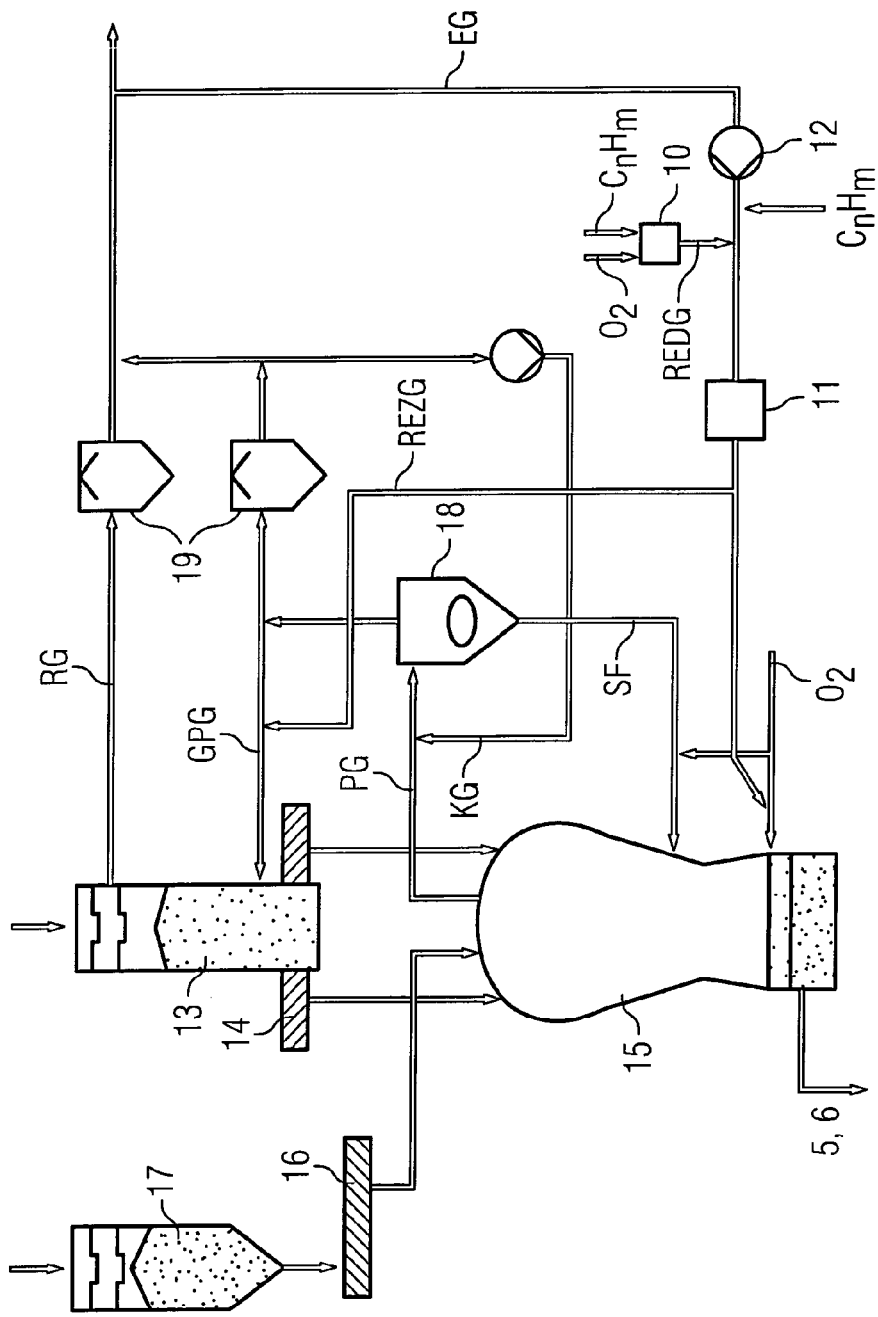
FIG. 2 shows a diagram of the application of the method according to the invention for the melting of pig iron in a melt-reduction plant.

FIG. 2 illustrates a further exemplary embodiment of the method according to the invention, specifically in respect of a melt-reduction plant. Plants of this type are used for the production of liquid pig iron, for example via a COREX® method. In this case, in contrast to the blast furnace process, no blast furnace coke is required. Although the method according to the invention can also be applied to other production processes, for example the FINEX® method, the method according to the invention is explained below with reference to the COREX® method outlined in FIG. 2.

The method shown is a two-stage melt-reduction method ("smelting reduction"), in which, in a first step, the ore of the pig iron is reduced to sponge iron, and, in a second step, the final reduction, melting down and carburization into pig iron take place. The energy necessary for the melting operation is in this case provided by means of the gasification of coal. In this case, large quantities of carbon monoxide and hydrogen occur as crude gas which can be used as reduction gas.

As is clear from FIG. 2, first, lump ores, sinter, pellets or mixtures thereof are introduced into a reduction shaft 13 and are reduced in countercurrent with the reducing process gas GPG. After running through the reduction shaft 13, the final product from this first stage is conveyed via discharge worms into the melt-down gasifier 15 arranged underneath. The crude gas RG occurring in the reduction shaft 13 is discharged from the reduction shaft 13 and is purified in a scrubber 19. A part stream of the reduction gas, after purification and cooling, is used as cooling gas KG for the process gas PG drawn off from the melt-down gasifier 15. The reduction gas, occurring as regulating gas, is mixed, after cooling and purification, with the crude gas RG.

In the melt-down gasifier 15, in addition to the remaining reduction and melting down of the sponge iron, the necessary metallurgical metal and slag reactions take place. Subsequently, as in the blast furnace, a pig iron fraction 5 and a slag fraction 6 are obtained from the melt-down gasifier 15 and are periodically tapped.

Coal which is conveyed out of a coal storage shaft 17 via a coal conveyor worm 16 is introduced into the melt-down gasifier 15. After the dewatering and degassing of the coal, a solid bed of low-temperature carbonization coke is first formed in the melt-down gasifier 15 and is subsequently gasified with oxygen. The hot process gas PG occurring has temperatures of about 1000° C., consists predominantly of CO and $H_2$ therefore has a reducing action and is laden with fine dust. This process gas PG is cooled by being blended with the cooling gas KG, is de-dusted in a cyclone 18, for example a hot cyclone, and is finally supplied to the reduction shaft 13 as purified process gas GPG. Excess gas is purified in a further scrubber 19. A part stream of the reduction gas is used as cooling gas KG. The separated dust fraction SF from the cyclone 18 is reintroduced into the melt-down gasifier 15 and is used materially or gasified with oxygen.

Furthermore, the combustion chamber 10 necessary for carrying out the method according to the invention and the reformer 11 are again evident in FIG. 2. In the combustion chamber 10, hydrocarbons, for example natural gas, are oxidized under-stoichiometrically with oxygen gas which contains an oxygen fraction of above 90% by volume. The chemical reactions, once again, take place as stated above. Downstream of the combustion chamber 10, the reduction gas REDG is obtained, which consists mainly of $H_2$ and CO with a temperature of approximately 1500° C.

The purified crude gas, which in this case is designated as export gas EG, is first compressed in a compressor 12, blended with hydrocarbons of the general formula $C_nH_m$ or with a mixture thereof, for example natural gas, and subsequently mixed uniformly with the reduction gas REDG from the combustion chamber 10. The gas thus formed is designated below as recirculation gas REZG. For this purpose, as has likewise already been stated, a sufficient mixing zone or mixing chamber for setting a uniform temperature distribution is required. As a result of this mixing, the initial temperature of the reduction gas REDG is lowered, and temperatures of the recirculation gas REZG of about 1000° C. are achieved. The temperature of the recirculation gas REZG is in any event to amount to more than 800° C. in order to prevent carbon separation in the case of unfavorable Boudouard equilibria.

This recirculation gas REZG is subsequently routed through a reformer 11 which is a vessel or tubes filled with a catalyst, the reforming of the hydrocarbon-containing gases taking place, and the quality of the gas being appreciably improved by an increase in the CO and $H_2$ content in relation to the $CO_2$ and $H_2O$ content. The reactions taking place in the reformer 11 proceed, once again, in the same way as in the exemplary embodiment described above.

As a result of the reforming process, the recirculation gas REZG is cooled further to temperatures of about 800° C. The recirculation gas REZG subsequently supplied to the coarsely purified process gas GPG and to the reduction shaft 13 or is introduced into the melt-down gasifier 15 via oxygen nozzles.

As a result of this recirculation and reforming with higher hydrocarbons, several advantages arise, as compared with the prior art. Since no complicated $CO_2$ and/or $N_2$ removal is required, investment costs can be saved, as compared with other methods, and residual gas occurring due to the $CO_2$ removal, which would otherwise have to be delivered for utilization or retreatment, can be avoided. In general, lower $CO_2$ emissions are obtained, since the $CO_2$ from the blast furnace gas is reformed with higher hydrocarbons (for example, $CH_4$, $C_2H_6$, $C_3H_8$, $C_4H_{10}$, etc.) and is used again for reduction. Furthermore, the efficiency in the generation of the heat required for reforming and injection into the blast furnace can be increased, since no fuel gases for the underfiring of the reformer 11 are necessary.

Furthermore, metal dusting corrosion due to CO-containing reduction gas can be reduced during heating, reforming and transport, since the combustion chamber 10 and the corresponding pipelines to the blast furnace are lined, and removals can be kept very short.

A further advantage is the cooling of the raceway due to the directed lowering of the flame temperature on account of the endothermal reaction of the coke with the fractions of $H_2O$, $CO_2$ and $CH_4$ still present in very small quantities:

However, since excessive cooling does not occur on account of the low concentrations, a substantially larger quantity can be introduced into the blast furnace 1 than in the case of straightforward natural gas or oil injection. Moreover, the possibilities afforded of saving coal and coal briquettes as reducing agent by the recirculation of reductants (CO, $H_2$) from the recirculation gas REZG and reforming with carbon-containing gases. The method according to the invention therefore allows a marked lowering of the operating costs of the overall plant.

The invention claimed is:

1. A method for melting of pig iron in a blast furnace operated with oxygen or in a melt-reduction plant, each having a reduction region, the method comprising:
   discharging purified crude gas from the reduction region, compressing the crude gas,
   adding hydrocarbons to the compressed crude gas to produce a mixture;
   generating a reduction gas which has a temperature of above 1000° C. by partial oxidation of hydrocarbons by means of oxygen gas having an oxygen content of above 90% by volume,
   blending the mixture of compressed crude gas and hydrocarbons with the reduction gas in a sufficient mixing zone or mixing chamber for setting a uniform temperature distribution in order to form a recirculation gas with a temperature of above 800° C., and
   then recirculating the recirculation gas into the reduction region according to an auto-reforming process.

2. The method as claimed in claim 1, wherein the auto-reforming process takes place in a reformer filled with a corresponding catalyst.

3. The method as claimed in claim 1 further comprising introducing the recirculation gas into the reduction region of a blast furnace, via tuyeres, at a level above the tuyeres or into a shaft of the blast furnace.

4. The method as claimed in claim 3, further comprising recirculating the recirculation gas via the tuyeres along with an injection of fine coal.

5. The method as claimed in claim 1, wherein the hydrocarbons supplied to the purified crude gas are hydrocarbons of the general formula $C_nH_m$ or a mixture of these hydrocarbons.

6. The method as claimed in claim 1, further comprising recovering heat from the crude gas.

7. The method as claimed in claim 1, further comprising purifying the crude gas including a dry de-dusting of the crude gas.

8. The method as claimed in claim 1, further comprising:
   before the discharging of crude gas, introducing raw materials for producing melted pig iron into the reduction chamber.

* * * * *

UNITED STATES PATENT AND TRADEMARK OFFICE
CERTIFICATE OF CORRECTION

| | | |
|---|---|---|
| PATENT NO. | : 8,287,620 B2 | Page 1 of 1 |
| APPLICATION NO. | : 12/867551 | |
| DATED | : October 16, 2012 | |
| INVENTOR(S) | : Robert Millner, Kurt Wieder and Johann Wurm | |

It is certified that error appears in the above-identified patent and that said Letters Patent is hereby corrected as shown below:

Title Page, Item (86), should read;

Item (86) Date: August 27, 2010

Signed and Sealed this
Twenty-ninth Day of January, 2013

David J. Kappos
*Director of the United States Patent and Trademark Office*